United States Patent [19]

Caldwell

[11] Patent Number: 4,551,847
[45] Date of Patent: Nov. 5, 1985

[54] HAND HELD DIGITAL MEASURING DEVICE

[76] Inventor: W. Kenneth Caldwell, 11700 W. 24th Pl., Lakewood, Colo. 80215

[21] Appl. No.: 483,381

[22] Filed: Apr. 8, 1983

[51] Int. Cl.$^4$ .............................................. G01B 3/08
[52] U.S. Cl. .................................... 377/24; 33/137 R
[58] Field of Search .............. 377/24; 33/137 R, 138, 33/140

[56] References Cited

U.S. PATENT DOCUMENTS

| | | | |
|---|---|---|---|
| 2,854,753 | 10/1958 | Caparros | 33/139 |
| 4,103,427 | 8/1978 | Ledley, III | 377/53 |
| 4,164,816 | 8/1979 | Bergkvist | 33/139 |
| 4,178,691 | 12/1979 | Tateisha | 377/24 |
| 4,186,490 | 2/1980 | Quentot | 33/139 |
| 4,189,107 | 2/1980 | Quentot et al. | 33/138 |
| 4,242,514 | 12/1980 | Grant | 377/24 |
| 4,296,554 | 10/1981 | Hammerstom | 33/138 |
| 4,395,630 | 7/1983 | Ramsden et al. | 33/140 |

*Primary Examiner*—John S. Heyman
*Assistant Examiner*—K. Ohralik
*Attorney, Agent, or Firm*—James E. Pittenger

[57] ABSTRACT

A hand-held tape measure is provided which includes a conveniently sized housing with an elongated measuring tape suitably coiled on a rotatable shaft mounted within said housing. A sprocket arranged to engage the surface of the tape without slippage is mounted within the housing and drivingly connected to an encoding disk whereby the rotation of the disk is directly proportional to the linear movement of the free end of the tape. The disk is divided into an equal number of alternating transparent and opaque segments and two energy sensitive coupler switches are mounted in conjunction with the disk to provide electrical outputs indicative of the adjacent disk segment to indicate the rotation of the disk. The switches are offset circumferentially to provide a phase differential which indicates whether the tape is extending or retracting with respect to the housing. The output from the switches is fed to an electronic circuit which counts and divides the output pulses with the result digitally displayed. A variable speed reversible motor which is powered by an internal power source can be drivingly connected to the tape to control its movement. A switch is provided on the housing for controlling the direction of the motor. This switch can also include a lock for holding the tape in the retracted position when the motor is deenergized.

27 Claims, 9 Drawing Figures

HAND HELD DIGITAL MEASURING DEVICE

FIELD OF THE INVENTION

This invention is directed to a hand held measuring device which provides a digital display. It is more specifically directed to a motorized tape measure which digitally measures the tape extension and displays the reading in various units.

BACKGROUND OF THE INVENTION

Various forms of measuring devices have been in use for hundreds of years. The ruler, yardstick or meter stick is quite efficient and can accurately measure dimensions within reasonable accuracy limits. However, the major problem with these types of measuring devices is that they are cumbersome and hard to handle, carry or store.

Because of these common problems various ways have been tried to make a measuring device compact and easily handled and carried. The two most common devices that have evolved are the folding measuring ruler which is commonly used by carpenters and the convenient hand-held tape measure.

One of the attributes of the hand-held tape measure is that it is generally light weight and easily stored and used. The tape is compactly coiled within the housing and is spring biased to retract into the housing when not in use. This device provides an additional feature in that the tape as it is extended has a slightly concave cross-sectional bow which allows the tape to extend outwardly, in a self-supporting configuration for a substantial distance. In addition, another common feature of this type of device is that the length of the housing behind the extension point of the tape is usually a standard set dimension so that the device can be used for measuring inside dimensions by merely adding the set length of the case to the measurement shown on the tape face.

The primary drawback with this type of device is that only relatively coarse and inaccurate measurements can actually be made. These measurements are also limited to the units to which the tape is graduated. The accuracy of the readings depends upon how small these units are divided and how accurately they are interpreted by the user. Naturally, the size of the graduation will determine how well they can be seen, especially under poor lighting conditions.

The present invention is directed to a way of conveniently extending or retracting the tape from the housing and at the same time providing an extremely accurate and convenient measurement reading. This reading can even be obtained where there is only limited light. At the same time, the present invention can instantly convert the displayed measurement reading to fractional or decimal units of either the English or metric system. All of this can be done in a matter of a few seconds.

INFORMATION DISCLOSURE STATEMENT

The following patents which are believed to be pertinent to the subject matter of this invention are presented in compliance with the inventor's duty to disclose all materials of which he is aware.

The Soule patent (U.S. Pat. No. 4,031,360) discloses an electronic tape measuring device comprising an electronic digital display unit connected to an electronic calculator. The device has a rachet wheel type sensing means for detecting the unwinding and winding of the tape on the reel. The readout in this device can be set to read in English or metric units. A manual electric switch is provided for operating the readout portion of the device.

The Grant patent (U.S. Pat. No. 4,242,574) discloses a digital display tape measure wherein the tape is optically encoded. As the tape passes optical fiber bundles, its indicia are read by electronic logic circuitry and exhibited on the digital display. There is a capability provided in this device for measuring lengths in either centimeters or inches as desired.

The Iwase patent (U.S. Pat. No. 4,181,848) and Tateishi, et al. (U.S. Pat. No. 4,181,960) discloses digital tape measures which incorporate a memory circuit. These devices are capable of performing addition and subtraction operations during the measuring function. In Tateishi, et al., a photo detector determines the length of the tape by noting the rotation of the spring loaded tape reel.

In the German patent which issued to Keller (DT No. 28 46 915), the length of the tape is shown in either centimeters or millimeters on a digital display. In addition, a magnifying glass is provided for reading the fine divisions on the tape. Electronic scanning markers can be provided for reading the measurement which is being made with the device.

SUMMARY OF THE INVENTION

This invention is directed to a hand-held digital measuring device, which includes a motorized tape which has an electronic digital sensor.

The tape is mounted within a suitable housing and is of the common thin metal variety which is wrapped or coiled on a rotatably mounted reel or shaft. A small reversible motor is connected to the shaft by a series of reduction gears with a belt drive connection to the tape shaft. A suitable operating switch can be utilized for energizing the motor in either the extend or retract direction. The motor can also be of the variable speed type so that the actual speed of the tape can be easily controlled. In addition, the high gear reduction will help to hold the tape in the extended position when the motor is deenergized.

The actual tape used in this device has an additional feature which is not found in most conventional tape measuring devices. A series of small equally spaced holes are provided along the longitudinal center of the tape. The surface of the tape can be left blank or marked with the usual indicia. A rotatable sprocket having pins or teeth which closely fit and engage the tape holes is suitably mounted within the housing. The sprocket is connected by speed increasing gears to an encoding disk which is rotatably mounted between oppositely positioned optical switches. The encoding disk, gears and sprocket are designed to have minimum or no backlash so that the rotation of the encoding disk will closely follow the lineal movement of the tape. A fine adjustment knob can be connected to the sprocket shaft and arranged to extend beyond the side of the housing whereby a precise length of the tape can be easily obtained.

The encoding disk is utilized in conjunction with at least two optical coupler switches to produce an electronic digital output that is arranged in direct proportion to the movement of the tape in either direction. This disk is composed of an even number of alternating segments or slots. In the present example, the segments are each 45 degrees making a total of eight segments. Four of the segments are transparent and allow infrared light to pass while the alternating four are opaque. This can be accomplished by cutting alternating segments out of a solid disk or forming the disk out of clear plastic and coating the alternating segments with a material which is opaque so as to block infrared or other light energy. The optical coupler switches are each composed of an infrared or light emitter on one side of the disk and a silicon collector on the opposite side which is sensitive to the generated energy. Usually, when the energy strikes the collector, current is allowed to flow resulting in an "on" condition or output. Optical switches, Model No. TIL143, manufactured by Texas Instruments, have been found to be quite satisfactory for this purpose.

One switch is offset one half of the width of a segment which would be $22\frac{1}{2}°$ in this example. Thus, the outputs from the coupler switches are out of phase by $22\frac{1}{2}°$ in either direction depending upon which direction the tape is moving. The pulses in the outputs from both switches are added and fed to an integrated circuit counter which processes the outputs to add or subtract to the display count or determine the final display reading.

The speed ratio between the sprocket and the encoding disk is arranged in the present example, to 1:4. By the same token, the diameter of the sprocket in the present example is sized so that the sprocket makes one revolution for each two-inch lineal movement of the tape. Thus, in this example herein the display readout can be given in fractions as small as 1/32nd of an inch.

It is to be understood that this device is not limited to the number of segments and gear ratios as described herein. The present arrangement was intended for English units but can be arranged to provide any desired units or divisions merely by changing the number of segments on the encoding disk, the gear ratio between the sprocket and the disk and the diameter of the sprocket. In this way, any desired measuring scales, divisions, or units in either the English or metric system can be provided as well as the display given in decimal or fractions with the degree of accuracy desired.

The invention also includes various other features such as a fence lug to be used in conjunction with the rip fence on a table saw. This feature can be used when the ripping dimension is less than the length of the tape housing. In addition, various electrical switches can be provided on the housing which will allow the digital readout to be reversed from one side to the other as well as electronic conversion of the readout from either English or the metric units. At the same time, the circuitry can be provided with a memory switch whereby measurements can be added or subtracted or reset as desired during a measuring function. Measurements longer than the total length of the tape can be made by electronically adding multiples of the total length of the tape to the actual tape reading to obtain the final dimension.

As an additional feature, the power switch can also include a lock which extends over the end of the tape when the switch is in the off position. This prevents the tape from extending when the power is off and can provide an automatic reset for the digital display.

Other features and advantages of the present invention will become apparent from the following detailed description of the invention when it is considered in conjunction with the accompanying drawings.

DETAILED DESCRIPTION OF THE DRAWINGS

Figure 1:
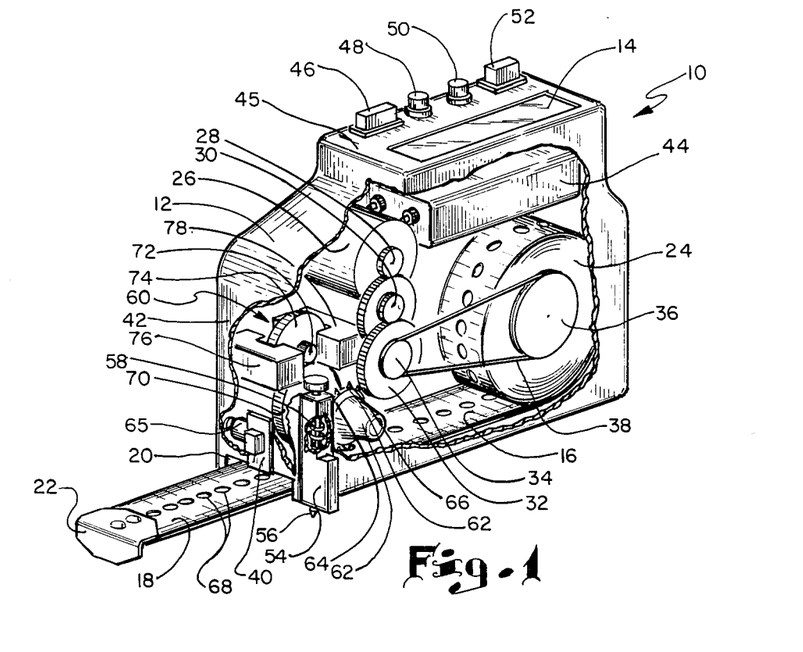
FIG. 1 is a perspective cutaway view of a hand-held digital tape measure according to the present invention.
Figure 2:
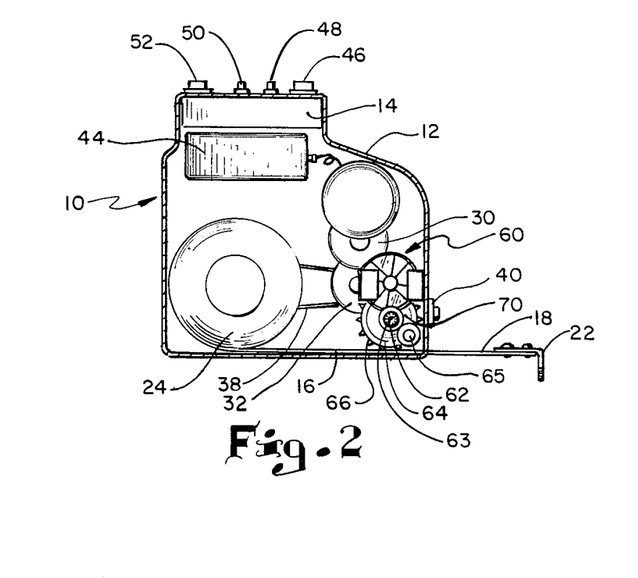
FIG. 2 is a right side cross-sectional view showing the internal arrangement of the components.
Figure 3:
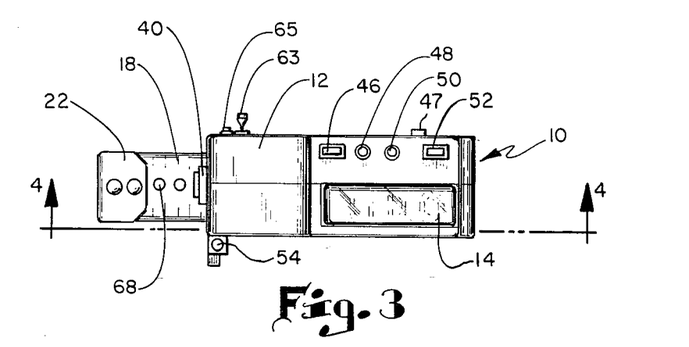
FIG. 3 is a top plan view with the tape slightly extended.
Figure 4:
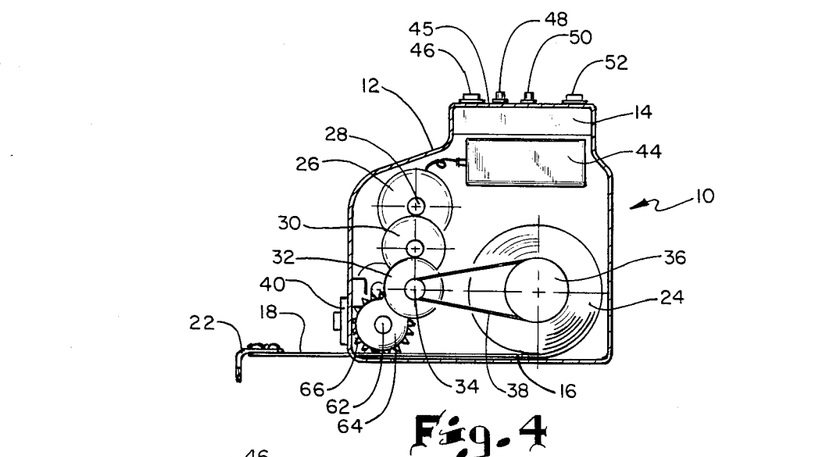
FIG. 4 is a left cross-sectional view.

Turning now more specifically to FIG. 1, the hand-held digital measuring device 10 according to the present invention, includes a case or housing 12, digital display 14, and measuring tape 16. The free end 18 of the measuring tape 16 extends through an elongated slot 20 provided at one end of the housing 12. A hook or clip 22 is suitably mounted on the end of the tape 18. The tape which can have any desired total length, such as 12 or 16 feet, is suitably coiled or wound on a reel or shaft 24 which is rotatably mounted within the housing 12. An electrical power source or battery 44 and small variable speed, reversible electric motor 26 are mounted within the housing. The motor 26 includes a pinion gear 28 connected to its output shaft.

Speed reducing gears 30, 32 suitably mounted within the housing are arranged to engage the pinion gear 28 and drive the reel 24 by means of the pulleys 34, 36 and belt 38. As can be easily seen, the speed of the motor through the gears 30, 32 and pulleys 34, 36 is greatly reduced for driving the reel 24. This provides two important results, one being that the reel or shaft is essentially locked when the motor is deenergized preventing the extended end 18 of the tape 16 from moving in either direction once the measurement has been established. The other is that the actual speed of the tape in or out of the housing can be precisely controlled by varying the rotational speed of the motor 26.

The switch 40 is a master switch which disconnects the motor and electronic circuitry from the electrical power source. This switch can also include a lock (not shown) which engages the end of the tape when in the off or deenergized position. This lock provides an additional restriction which prevents the tape from moving out of the housing when the motor is deenergized. The motor 26 is engaged by a normally "off", momentary switch 65. A variable resistant switch may be used for this purpose which would allow control over the speed of extension and retraction and also the direction of the tape movement.

The battery 44 for powering the motor is mounted within the housing and is arranged to be easily removed or replaced. The battery can be of the alkaline type, nickel-cadmium type or some other which will provide long service life and possibly can be recharged. If desired, the battery can be permanently mounted in the housing and recharged by a suitable case connection to an external charger. The battery also provides electrical power to the solid state electronic circuitry which is provided in conjunction with the digital display 14. It is anticipated that the electronic circuitry will include a prepackaged micro-computer circuit which will be mounted as a unit with the display 14 to compactly fit within the upper portion of the housing 12.

Along the upper surface 45 of the housing 12 are arranged a number of push button or rocker type control switches 46, 48, 50 and 52. Switch 46 provides an inside/outside measurement function while switch 52 provides the mode selection. Switch 48 can be utilized for resetting the display measurement to zero while control switch 50 can be utilized for the extended measurement function whereby units of the tape length can be added to the display reading for performing measurements longer than the single tape length. An additional switch 47 can be provided to reverse the display so that it can be read from either side of the housing. Other switches can be added or individual switches can perform dual functions if additional features are desired.

Figure 5:
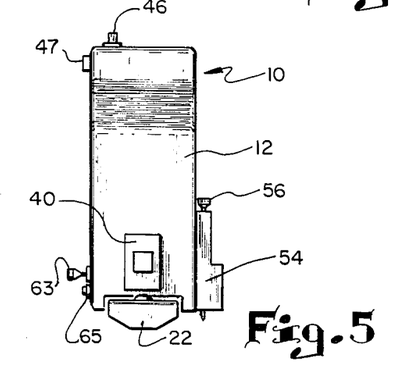
FIG. 5 is a front view showing the marking device along the right edge.
Figure 6:
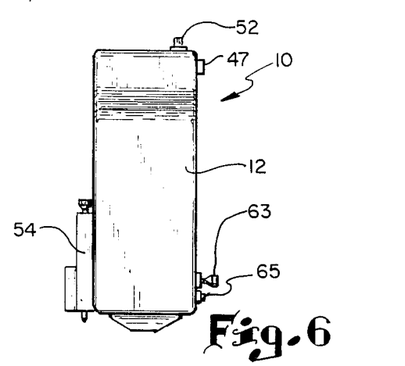
FIG. 6 is a rear view of the device.

A spring biased marker 54 is mounted on the side of the housing 12 adjacent to and in line with the edge of the housing to mark the exact location where the measurement is taken. This marker includes a pointed plunger 56 which is biased in the raised position by the spring 58.

A unique and sensitive tape sensing device 60 is suitably mounted within the housing 12. The sensing device 60 includes a rotatably mounted shaft 62 having a sprocket ring 64 mounted thereon. The sprocket includes a number of outwardly extending equally spaced teeth or pins 66. The tape 16 has a series of equally spaced holes 68 which are centrally arranged along the longitudinal axis of the tape over its entire length. The sprocket pins 66 have the same pitch or spacing as the pitch of the holes 68 so that they precisely engage and rotate the sprocket in response to any lineal movement of the tape end 18. In addition, the pins 66 can be tapered or pointed and the holes 68 sized slightly smaller than the base of the pins so that as the holes are engaged by the pins there will be a close fit to eliminate any backlash or relative movement between the tape and the sprocket If desired, a rotatable Teflon or nylon roller (not shown) can be suitably mounted below the tape to hold it in proper position against the sprocket. This roller as well as possibly several additional rollers can also help to reduce the friction between the tape and the inside surface of the housing.

The sensing device 60 further includes a gear 70 which is mounted on the sprocket shaft 62. The gear 70 engages a pinion gear 72 which is suitably mounted on a shaft which also contains an encoding disk 74. Mounted on either side and surrounding the encoding disk 74 are optical coupling switches 76 and 78. The gear ratio between the gear 70 and 72 is arranged so that one revolution of the sprocket 64 will produce four revolutions of the encoding disk 74. It is to be understood, however, that any desired ratio can be provided depending upon the desired sensitivity and accuracy of the sensing device. Thus, as can be readily understood as the free end 18 of the tape 16 either extends out of or is retracted into th housing 12 the sprocket 64 rotates following the precise movement of the tape. The rotational movement of the sprocket 64 is transmitted through the gears 70, 72 and is accurately translated into rotational movement of the encoding disk 74. An adjusting knob 63 can be arranged on the end of the sprocket shaft 62 so that it will protrude through an opening in the side of the housing 12. By turning the knob 63 a fine adjustment can be made to the length of the extended tape to make a precise measurement.

Figure 7:
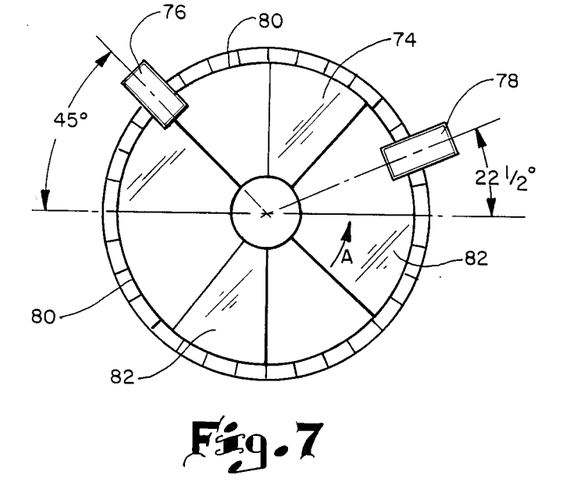
FIG. 7 is a pictorial enlarged view of the encoding disk showing the energy opaque and transparent segments.

The coupler switches 76, 78 can be of the infrared digital output type. In these devices, infrared energy is generated on one side of the encoding disk with an infrared sensor provided on the opposite side. As can be seen in FIG. 7, the encoding disk can be equally divided into segments. Half of the segments are covered with a material which is opaque to the infrared energy and alternate with the other half which are transparent to this energy. As shown in this example, eight segments are provided with each encompassing a circular angle of 45 degrees. The coupler switches 76, 78 are mounted so as to straddle the edge of the encoding disk 74 and are arranged so that they are one half of a segment width or $22\frac{1}{2}$ degrees out of phase with each other as illustrated in FIG. 7. As can be easily seen, one coupler switch 76 is shown at a position which is precisely at the transition point between two segments. The second coupler switch 78 is positioned at the exact midpoint of a subsequent segment. The angular offset of the couplers with respect to each other is important and not the actual type of the respective segments. The signal output from the coupler switches is an "on" or "off" condition depending upon whether the associated segment is opaque or transparent. Thus, the output from each switch is essentially a series of square wave pulses with the electrical output of one switch being out of phase one-half of the width of a pulse compared to the other.

Figure 8:
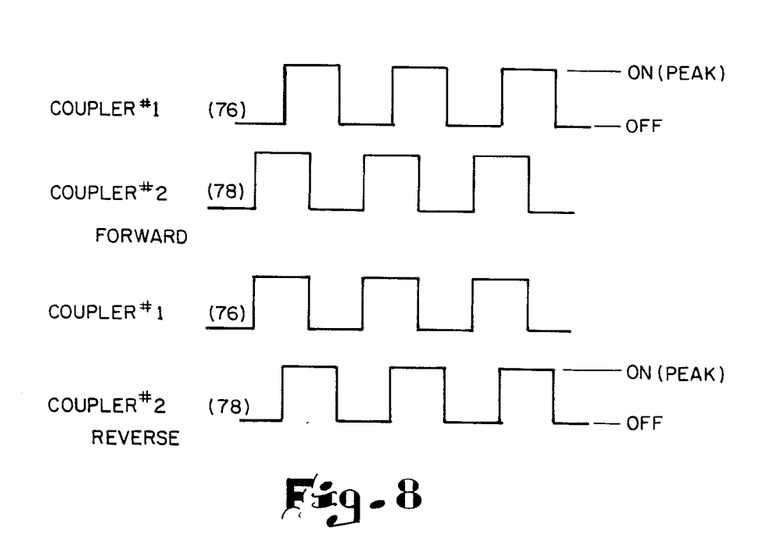
FIG. 8 shows the output wave form and phase relationship between the coupler switches during the forward and reverse rotational movement of the encoding disk.

In FIG. 8, the phase relationship between coupler switch 78 and coupler switch 76 is either leading or lagging depending upon which direction the encoding disk 74 is rotating. The counterclockwise rotation of the encoding disk 74 as shown by arrow A is designated for the purpose of illustration as being the forward direction. This is a condition in which the tape end 18 is being extended from the housing 12. Upon reversal of the direction of the tape 16 and its retraction into the housing the rotational direction of the encoding disk 74 is reversed so that the cyclic output of the second switch is actually lagging behind the output of the first.

Figure 9:
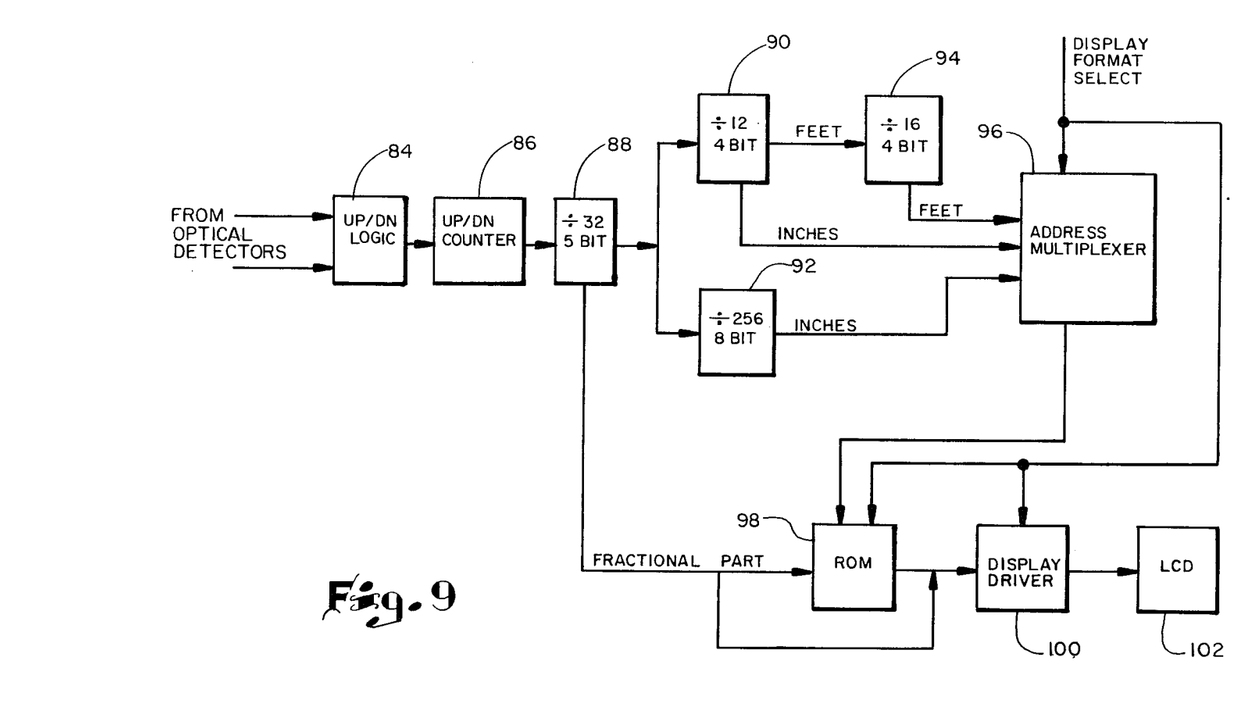
FIG. 9 is a block diagram of the electronic circuitry used in the present invention.

In FIG. 9 is shown a block diagram of the circuitry which can be utilized for obtaining the actual digital display. The outputs from the individual coupler switches are fed into an integrated circuit which includes a logic input circuit for determining the phase shift of the two signals to determine whether the tape is extending or retracting with respect to the housing. The other input circuit provides a counting function for counting the input pulses that are generated by both of the coupler switches. As previously mentioned, as the tape extends or retracts exactly two inches, the sprocket 64 makes exactly one revolution. Due to the speed increasing gears 70, 72 the encoding disk is caused to rotate precisely four times or four revolutions for each revolution that is made by the sprocket 64. The unique combined outputs from both switches during the angular rotation of the disk for one transparent and one opaque segment cycle results in four binary output functions or counts. Thus, the four revolutions of the encoder disk for the present illustration causes the production of 64 binary functions for both switches. For each inch of tape travel a precise total of 32 "on" or "off" binary functions or counts are produced for each coupler switch. Thus, each count is equal to precisely 1/32nd of an inch travel of the tape end 18. In this way, these binary on/off functions produce the digital input to the electronic circuitry.

As previously stated the outputs from the optical coupler switches are fed directly to an up/down logic circuit 84 which identifies the phase relationship of the outputs. From here the output goes through a counter 86 which feeds the resulting count directly into a divider 88. The divider 88 divides by 32. The output of this counter which is in whole inches, in turn, is split and fed into two divide circuits. One circuit 90 divides by 12 while the second 92 divides by 256. The output of the divider 90 splits with the residual output designated as inches connected directly to the address multiplex 96. The other output which represents units of feet is fed to a divider 94 which divides by 16 to convert the units of feet into units of total tape length. In the example that is provided in this application, the length of the tape is anticipated to be 16 feet. Thus, the output from this divider is fed directly to the address multiplexer 96 and represents a whole number or decimal fraction of the total length of the tape for that particular measurement. If greater than a whole number, the whole number can be stored and added to the next measurement to provide a reading for a measurement longer than the actual length of the tape. The other output of the 32 divider 88 represents the residual fractional part in inches of the total count which is fed directly into the Read Only Memory (ROM) 98. The output of the divider 92 which is in units of inches is also fed directly into the address multiplexer 96.

A display format selector switch such as switch 52 which determines the mode of operation for the device actuates an input to the address multiplexer 96 as well as a signal directly into the ROM 98 and the display driver 100. An output from the address multiplex circuit 96 is fed into the ROM 98 for later processing or comparison for conversion from English to metric units or vice versa. Any fractional parts of the original count from divider 88 is added in the ROM. Thus the output from the address multiplexer is compared with the previously stored information concerning fractions or decimals for the conversion from English to metric units. The output from this device is then fed directly into the display driver which in turn conditions the results for direct display by the liquid crystal diodes (LCD) which are provided in the display 102.

As can be easily seen, the described circuitry allows for an up or down counting depending upon which direction the tape is actually moving. Thus, when the tape is retracted into the housing the count is reversed or down counts from the original display measurement. In this way, the reading when the tape is completely retracted into the housing should return to exactly zero. In this way, a determination can be made as to the accuracy or tolerance that exists within measuring device. If the inaccuracy is extreme, then it is necessary to recalibrate or repair the unit prior to further use.

It is to be understood that the electrical power source for powering this device can be a replaceable or rechargeable battery or even a solar cell. A solar cell, especially for outside use can be used to directly power the unit or recharge an internal battery. The rechargeable battery can be permanently mounted within the housing and the housing connected directly to a suitable charger or a separate battery charger can be connected by a suitable jack.

While a hand held digital tape measure has been shown and described in detail in this application, it is to be understood that this invention is not to be limited to the exact form disclosed and changes in detail and construction of the invention may be made without departing from the spirit thereof.

What is claimed is:

1. A hand-held motorized measuring tape comprising:
   (a) a housing means;
   (b) a measuring tape means including an elongated thin and flexible tape having a predetermined length which is wound on a shaft which is rotatably mounted within said housing, the free end of said tape being arranged to extend outwardly from said housing through a suitable opening;
   (c) reversible drive motor means mounted within said housing and connected to said tape rotating shaft by a suitable drive means;
   (d) an electrical power source mounted in said housing, said power source including a switch mounted on the outer surface of said housing and electrically connected to said motor means to energize said motor means in either the forward or reverse direction so as to result in the extension or retraction of the free end of the measuring tape with respect to the housing;
   (e) a digital output display means mounted on said housing and a sensing means positioned within said housing, said sensing means being arranged in conjunction with said measuring tape to accurately measure the lineal extension of said tape means and to provide an accurate digital output reading of the extended length of the tape on the display means; said tape means having a series of equally spaced holes arranged along its central longitudinal axis and said sensor means includes a rotatably mounted sprocket which is arranged to mesh with the holes in said tape and to be rotated by the movement of said tape;
   (f) an encoding disk;
   (g) said sprocket means is drivingly connected to said ending disk whereby any rotation of the sprocket will be directly translated to similar rotation in the encoding disk, and switch means mounted in conjunction with said encoding disk to sense rotational movement of said disk and provide an output to the digital display means to accurately indicate the extended length of the tape means; and
   (h) said encoding disk is divided into alternating segments and the switch means includes at least two optical switches which are positioned around the circumference of said disk to provide electrical phase-related inputs to the electronic circuit for said display means which are indicative of the rotational direction of the adjacent disk segment.

2. A motorized measuring tape as defined in claim 1 wherein said electrical power source is a battery.

3. A motorized measuring tape as defined in claim 2 wherein said housing means includes means for easily removing the battery for replacement.

4. A motorized measuring tape as defined in claim 2 wherein the battery is of the rechargeable type and said housing means includes means whereby the battery can be recharged without removal from the housing means.

5. A motorized measuring tape as defined in claim 1 wherein said electrical power source is a solar cell which is mounted on said housing means and is arranged to provide the necessary electrical energy for powering said measuring tape.

6. A motorized measuring tape as defined in claim 1 wherein said motor means is of the variable speed type and said switch provides variable speed control for said motor when rotating in either the forward or reverse direction.

7. A motorized measuring tape as defined in claim 1 wherein the width of each segment of said encoding disk is equal to all others and one optical switch is offset from the other by an arc which is equal to one half of the width of a segment plus the width of any number of additional segments whereby the output from one switch is out of phase with the other by a predetermined amount so that the direction of rotation of the encoding disk can be easily determined.

8. A motorized measuring tape as defined in claim 1 wherein the electrical circuit includes means for converting the displayed reading from one set of units of measure to any other.

9. A hand-held digital tape measure for providing accurate measurements of length, the tape measuring including:
   (a) a housing means;
   (b) an elongated measuring tape having a predetermined length which is attached at one end and wound on a shaft rotatably mounted within said housing means, the opposite free end of said tape being arranged to extend outwardly from said housing means through a suitable opening whereby the actual length of said tape extending from said housing can be used to provide an accurate dimensional measurment of an object;
   (c) sensing means mounted within said housing means and arranged in conjunction with said tape to provide an output indicative of the actual lineal movement of the free end of said tape at it extends or retracts with respect to said housing means;
   (d) digital display means mounted on said housing means and having an electronic circuit which receives the output from said tape sensing means whereby the actual length of said tape extending beyond the opening in said housing means will be accurately measured and indicated in the display means;
   (e) said measuring tape has a series of small equally spaced holes extending along the central longitudinal axis;
   (f) the sensing means includes a sprocket and encoding disk which are drivingly interconnected and rotatably mounted within said housing means, said sprocket being positioned to engage the holes provided in said tape so that as the tape moves lineally with respect to said housing, the encoding disk will rotate as a predetermined proportional rate; and
   (g) said encoding disk has a number of equally spaced alternating segments around its circumference and at least two optical coupler switches mounted with respect to said disk edge so as to sense the rotational movement of the disk whereby the switches will each produce an electrical output phase relation indicative of the adjacent segment which is fed to the electronic circuit means where it is processed to determine the display output for the measurement.

10. A digital tape measure as defined in claim 9 wherein said sprocket includes around its outer perimeter a series of outwardly extending equal angularly spaced tapered pins, the pitch of the pins on said sprocket being arranged to match the pitch of the holes on said tape, the holes in said tape being sized to have a slightly smaller diameter than the maximum diameter of said pins so that during the movement of said tape the pins will closely fit the holes and eliminate all backlash between the tape means and sprocket to provide accurate movement of the encoding disk with respect to the tape means.

11. A digital tape measure as defined in claim 10 wherein a speed increasing gear means is provided between said sprocket and the encoding disk whereby the rotational speed of the disk is directly proportional to the rotational speed of the sprocket.

12. A digital tape measure as defined in claim 9 wherein one coupler switch is angularly offset one-half of the width of a segment of said encoding disk from the other coupler switch whereby the phase relationship between the outputs can indicate the direction of movement of the tape means.

13. A digital tape measure as defined in claim 9 wherein the electronic means includes memory means and conversion means for converting the output from the sensor means to a digital measurement display in any desired decimal or fractional units.

14. A digital tape measure as defined in claim 9 wherein said housing includes a marking means mounted adjacent to the opening for said tape means whereby the actual measurement point can be precisely identified.

15. A digital tape measure as defined in claim 9 wherein the sensor means includes an adjusting means extending through the side of said housing whereby the actual extended length of said tape can be precisely set to obtain the desired display reading.

16. A digital tape measure as defined in claim 9 wherein the electronic means includes a means for the addition of multiples of the predetermined tape length for adding to the display readout so that measurements longer than the predetermined length of the tape measure means can be made and shown directly by said display means.

17. A digital tape measure as defined in claim 9 which further includes a reversible motor connected to an electrical power source and drivingly connected to the shaft supporting said coiled tape means, switch means mounted on said housing for electrically controling the direction of rotation of said tape means whereby the tape can be power driven in either the extending or retracting direction with respect to said housing.

18. A digital tape measure as defined in claim 17 wherein the control switch includes a lock which is arranged to engage and hold the tape to prevent movement with respect to the housing when the motor and electronic circuit are deenergized.

19. A digital tape measure as defined in claim 9 which further includes a switch for reversing the display of the display means so that it can read from either side of the housing.

20. A hand-held tape measure for precisely measuring the length of an object and displaying this length digitally, the tape measure comprising:
   (a) a housing;
   (b) a source of electrical power mounted within said housing;
   (c) a coiled elongated thin tape having a predetermined length which is coiled for storage on a rotatable shaft mounted within said nousing, the free end of said tape being arranged to extend tnrough a suitable opening in the side of said housing whereby the length of tape extending from said opening can be used to precisely measure the dimension of an object;

(d) said tape having a series of equally spaced apertures provided along its entire longitudinal axis and a sprocket rotatably mounted within said housing and arranged to engage the holes in said tape;

(e) an encoding disk rotatably mounted within said housing drivingly connected to said sprocket by a series of speed increasing gears whereby the rotational movement of said disk is directly proportional to the rotation of said sprocket which in turn is directly related to the linear movement of said tape;

(f) said encoding disk having alternating equally spaced transparent and opaque segments around its entire cirumference and at least two optical switches mounted so as to engage at least an edge of said disk and connected to said electrical power source whereby said optical switches will sense the phase of said segments and provide an electrical output depending upon its adjacent disk segment;

(g) digital display means mounted on said housing, said digital display means including electronic circuit means which is powered by the electrical power source and arranged to receive and process the output from said switches so that a digital output display will be provided in units of measurement which correspond to the total length of the free end of the tape which extends beyond the opening in said housing;

(h) reversible motor means suitably mounted within said housing and connected to said internal electrical power source, said reversible motor means is drivingly connected to the coiled tape measure means whereby the rotation of said motor will extend or retract the free end of said tape with respect to the housing; and (i) switch means mounted on said housing and electrically connected to said motor means, said switch means including variable control means whereby the actual rotational speed of said motor can be precisely varied to control the speed with which the tape is extended or retracted whereby precise measurements of length can be made.

21. A hand-held tape measure as defined in claim 20 wherein the energy power source provided within said housing is a battery and the electrical circuit means includes means for converting the displayed output to any desired units of measurement.

22. A digital tape measure as defined in claim 9 which further includes a reversible motor connected to said electrical power source and drivingly connected to the shaft supporting said coiled tape means, lock means arranged to hold the end of the fully retracted tape within said housing, said lock means having electrical contacts connected thereto for deenergizing said power source from said sensor and display means and motor when the lock means engages the end of the fully retracted tape means.

23. A hand held digital measuring device for providing accurate measurements of length, the measuring device including:

(a) a housing means;

(b) an elongated measuring means having at least a straight portion and first and second ends with a predetermined length therebetween, said straight portion of said elongated measuring means being slidably mounted with respect to said housing means so that the first end will extend beyond one side of said housing means;

(c) sensing means mounted within said housing and arranged in conjunction with said measuring means to provide an output indicative of the actual lineal movement of the housing means from the first end as the housing means moves along said measuring means;

(d) digital display means mounted on said housing means and having an electronic circuit which receives the output from said tape sensing means whereby the actual length of the first end of said measuring means extending beyond the side of the housing means will be accurately measured and indicated by the display means;

(e) said measuring means having a series of small equally spaced holes extending along the central longitudinal axis;

(f) the sensing means includes a sprocket and encoding disk which are drivingly interconnected and rotatably mounted within said housing means, said sprocket being positioned to engage the holes provided in said measuring means so that as the measuring means moves with respect to said housing means the encoding disk will rotate at a predetermined rate; and (g) said encoding disk has a number of equally spaced alternating segments around its circumference and at least two optical coupler switches mounted with respect to said disk edge so as to sense the phase of said segments and the rotational movement of the disk whereby the switches will each produce an electrical output indicative of the adjacent segment which is fed to the electronic circuit means where it is processed to determined the display output for the actual measurement.

24. A digital measuring device as defined in claim 23, wherein a speed increasing gear means is provided between said sprocket and the encoding disk whereby the rotational speed of the disk is directly porportional to the rotational speed of the sprocket.

25. A digital measuring device as defined in claim 23, wherein the electronic means includes memory means and conversion means for directly converting the output from the sensor means to a digital measurement display in any desired measuring unit and scale.

26. A digital measuring device as defined in claim 23, wherein a control switch is provided for energizing the electronic digital circuit and said control switch includes a lock which is arranged to engage and hold the measuring means to prevent movement with respect to the housing means when the electronic digital circuit is deenergized.

27. A digital measuring device as defined in claim 23, wherein the encoding disk segments are of alternating transparent and opaque material.

* * * * *